(12) United States Patent
Wolfer et al.

(10) Patent No.: US 7,493,836 B2
(45) Date of Patent: Feb. 24, 2009

(54) MEASURING SENSOR COMPRISING A PRE-STRESSING DEVICE

(75) Inventors: Peter Wolfer, Kleinandelfingen (CH); Andri Lehmann, Winterthur (CH); Georges Schaffner, Hittnau (CH)

(73) Assignee: Kistler Holding, AG, Winterthur (CH)

( * ) Notice: Subject to any disclaimer, the term of this patent is extended or adjusted under 35 U.S.C. 154(b) by 320 days.

(21) Appl. No.: 10/543,924

(22) PCT Filed: Feb. 5, 2004

(86) PCT No.: PCT/CH2004/000064

§ 371 (c)(1),
(2), (4) Date: Jul. 13, 2006

(87) PCT Pub. No.: WO2004/070334

PCT Pub. Date: Aug. 19, 2004

(65) Prior Publication Data
US 2007/0034027 A1    Feb. 15, 2007

(30) Foreign Application Priority Data
Feb. 5, 2004    (CH) .................................. 0174/03

(51) Int. Cl.
*G01L 1/16*    (2006.01)
(52) U.S. Cl. .................. 73/866.5; 73/862.541
(58) Field of Classification Search ........... 73/866.5, 73/862.541, DIG. 4, 862.325, 862.625
See application file for complete search history.

(56) References Cited

U.S. PATENT DOCUMENTS

| 3,269,175 | A |   | 8/1966 | Sprosty |
| 4,075,525 | A |   | 2/1978 | Birchall |
| 4,088,015 | A |   | 5/1978 | Wolfer |
| 4,392,082 | A |   | 7/1983 | Harada |
| 5,560,463 | A | * | 10/1996 | Link et al. ............. 192/70.252 |
| 6,807,863 | B2 | * | 10/2004 | Brammer .................... 73/702 |
| 2003/0154763 | A1 |   | 8/2003 | Brammer |

FOREIGN PATENT DOCUMENTS

| CH | 587475 | 4/1977 |
| DE | 2812689 | 9/1979 |
| DE | 19960325 | 6/2001 |
| EP | 1111360 | 6/2001 |

OTHER PUBLICATIONS

International Search Report PCT/CH2004/000064, Feb. 6, 2004.

\* cited by examiner

*Primary Examiner*—Thomas P Noland
(74) *Attorney, Agent, or Firm*—Dority & Manning, P.A.

(57) ABSTRACT

The invention relates to a measuring sensor held under prestress for measuring forces and/or torques. In the inventive embodiment, a sensor is integrated into an adapter sleeve, which is configured in a compact manner in such a way that it is equipped with devices for connection to an adapter part and devices for fixing to a measuring component. The sensor is subjected to the required pre-stress by connecting the adapter sleeve to the adapter part. An amplification module can also be mounted in the adapter sleeve.

13 Claims, 3 Drawing Sheets

MEASURING SENSOR COMPRISING A PRE-STRESSING DEVICE

CROSS REFERENCE TO RELATED APPLICATIONS

This application claims priority from previously filed PCT application number PCT/CH2004/000064 filed on Feb. 5, 2004 which claims priority from CH 0174/03 filed Feb. 5, 2003.

STATEMENT REGARDING FEDERALLY SPONSORED RESEARCH OR DEVELOPMENT n/a

BACKGROUND OF THE INVENTION

The invention relates to a measuring sensor under pre-stress for measuring forces and/or moments.

Measuring sensors are inter alia used as stackable machine elements for the installation into machine or device elements transmitting force and/or moments to measure forces, pressures, accelerations, expansions and moments. Such measuring sensors may be piezoelectric, piezoresistive, optical, capacitive or based on strain gages (DMS). In the following, piezoelectric measuring sensors will be mainly detailed. In these for example, suitable crystals having piezoelectric characteristics in the form of thin discs are incorporated into a sleeve in a centered manner and welded under a membrane exerting a desired pre-stress to the crystals. On the one hand, the pre-stress ensures that the measurement is effected in the linear measuring range of the sensor. On the other hand, also a signal within the linear measuring range of the sensor is generated thereby if negative forces (tensile forces) or vibrations are measured.

However, the level of the measurable tensile forces is too low for many applications with large tensile forces and is limited by the tensile stability of the welding of the membrane to the sleeve of the sensor. To be able to measure higher tensile forces or shearing forces the sensor is incorporated between two adaptor elements by means of a centering sleeve in a centered manner and is placed under an additional pre-stress by means of a suitable screw connection of the adaptor elements.

The arrangement described herein as prior art exhibits certain disadvantages. On the one hand, the overall height of such measuring arrangements is often very large. On the other hand, two centerings (of the crystals in the sensor and of the sensor in one of the adaptor elements) have to be conducted, which is quite elaborate.

SUMMARY

Various features and advantages of the invention will be set forth in part in the following description, or may be obvious from the description, or may be learned from practice of the invention.

The present invention provides for, in accordance with one exemplary embodiment, a measuring sensor that includes an adapter sleeve configured for receiving a sensor. The adaptor sleeve receives the sensor in order to hold the position of the sensor stationary with respect to an axis through the center of the adapter sleeve. An adapter element is present and is connected to the adapter sleeve so that the sensor is positioned between the adapter sleeve and the adapter element. The connection of the adapter sleeve and the adapter element is made so that the sensor is pre-stressed.

The object of the present invention is to provide a sensor and a measuring arrangement for both positive and negative forces, pressures, accelerations, expansions, shearings and/or moments, which require a small overall height and which enable a simple and cost effective manufacture in the configuration thereof.

According to the present invention, this object is solved by the characterizing part of claim 1.

These and other features, aspects and advantages of the present invention will become better understood with reference to the following description and appended claims. The accompanying drawings, which are incorporated in and constitute part of the specification, illustrate embodiments of the invention, and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures.

In the following, the invention is detailed with respect to the Figures, in which.

DETAILED DESCRIPTION OF REPRESENTATIVE EMBODIMENTS

Figure 1:
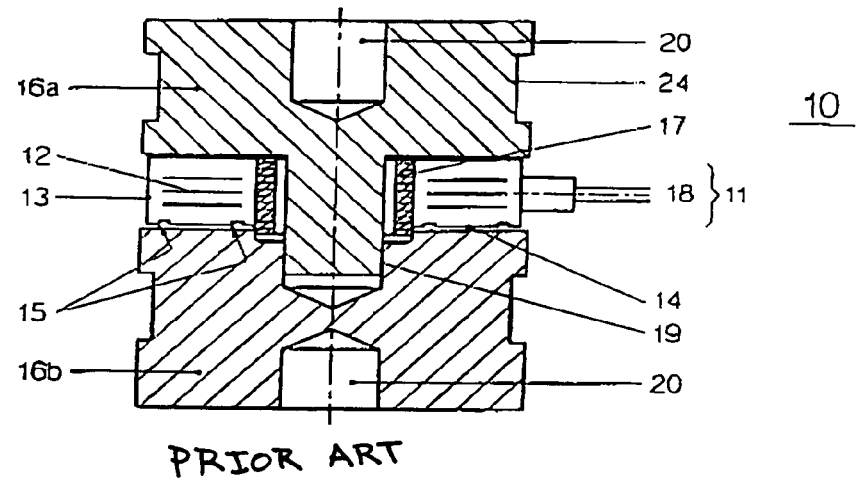
FIG. 1 illustrates the prior art of a measuring sensor under pre-stress in a cross-sectional view.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

FIG. 1 shows a measuring sensor 10 under pre-stress as prior art. The central portion is formed by a sensor 11. It contains suitable crystals 12 with piezoelectric properties, which are incorporated into a sleeve 13 in a centered manner.

One membrane 14 covers these crystal plates. It is attached under pre-stress by means of welding joints 15 to sleeve 13. At sleeve 13, there also is a suitable connection plug 18 at which the signal generated by the crystals 12 may be transmitted and analyzed. Between two adaptor elements 16a and 16b, the sensor 11 is incorporated by means of a centering sleeve 17 in a centered manner and is placed under additional pre-stress by means of a suitable connection device 19 connected to the adaptor elements 16. These adaptor elements 16 exhibit suitable attachment devices 20 for the components or elements which are placed under pressure and tension and which are to be measured (not shown in the drawings). Additionally, the adaptor elements 16 may include suitable engaging devices 24 for tools, e.g. by a partially flat or hexagonal embodiment of the edge, enabling a force impact by means of a tool, e.g. a hexagonal wrench.

Figure 2:
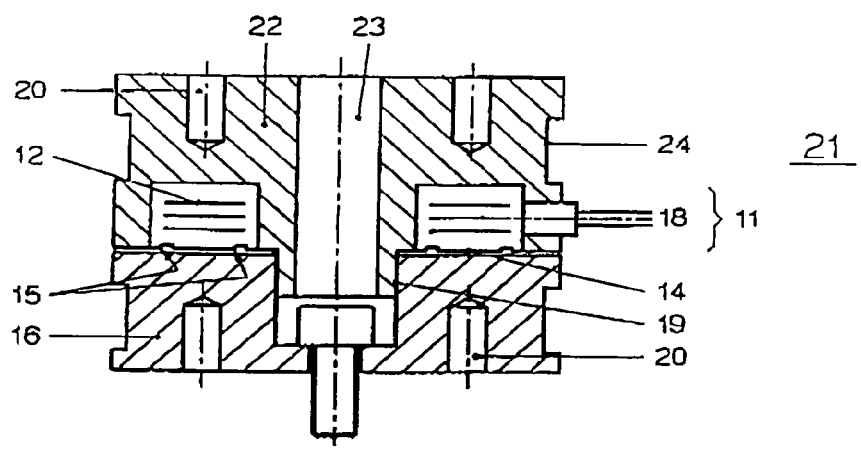
FIG. 2 illustrates an embodiment of the invention of a measuring sensor under pre-stress in a cross-sectional view.

FIG. 2 shows an example of a possible embodiment 21 of the invention of a measuring sensor. In this embodiment 21 a sensor 11 is integrated into an adaptor sleeve 22 by incorporating measuring crystals 12 in adaptor sleeve 22 in a centered manner and covering them under a membrane 14. This membrane 14 is attached under pre-stress to the adaptor sleeve 22 by means of welding joints 15.

The adaptor sleeve 22 is formed in a solid manner and combines according to the present invention all functions of sleeve 13, of the adaptor element 16a and the centering sleeve 17 in one single element. By the combination of the three parts (13, 16a, 17) the centering of the sensor 11 in an adaptor element is omitted. By means of the connection device 19 which preferably is formed as a screw thread the adaptor element 16 is attached to the adaptor sleeve 22 whereby sensor 11 is placed under pre-stress.

The adaptor sleeve 22 has a connection plug 18 for the signal transmission as well as an attachment device 20 for mounting to a component placed under pressure and tension (not shown in the drawings) and has an engaging device 24 as a working surface for tools as described under FIG. 1.

The attachment device 20 described herein may consist of one or more, preferably three attachment sites, which are e.g. formed as a screw bore and arranged on the adaptor sleeve in a spaced manner. By the use of several attachment sites, the dimensions thereof may be decreased, since the force of the components placed under pressure and tension is distributed to the number of attachment sites. Further, the center of the arrangement 21 of the present invention remains free for a mounting through bore 23, which may also be used for attachment at the components under pressure and tension. For this purpose, a protrusion at the adaptor element 16 or at the adaptor sleeve 22 in the region of the mounting bore 23 may serve to e.g. hold a screw. This screw may be attached to a suitable tool through the mounting bore.

By the arrangement 21 of the present invention of the attachment device 20 the height of the now single adaptor element 16 may be substantially lower than the adaptor element 16b of FIG. 1, since the connection device 19 of the prior art requires the central region of the arrangement 21 of the invention.

A further advantage of said embodiment is that the adaptor element 16 may easily be replaced by another one which exhibits an attachment device 20 adapted to a special application.

Figure 3A:
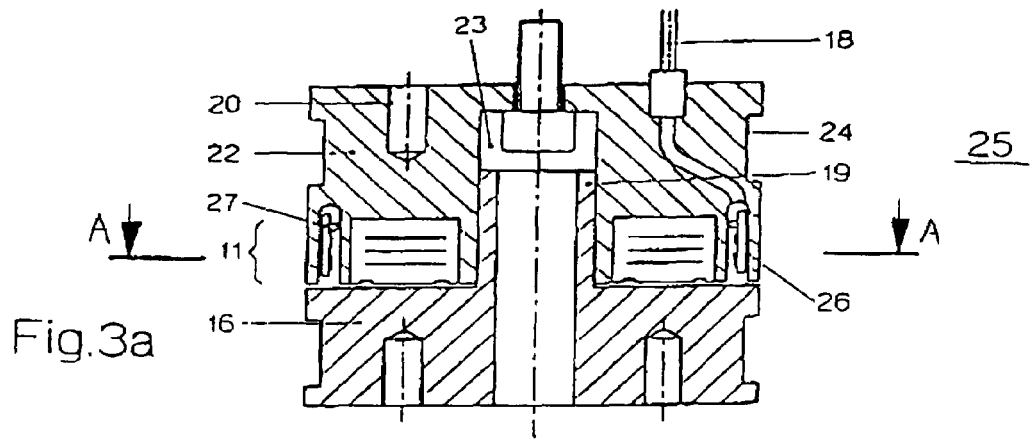
FIG. 3a illustrates a further example of an embodiment of the invention of a measuring sensor under pre-stress with an integrated amplifier module, in a cross-sectional view.

FIG. 3a illustrates an embodiment of the present invention of a measuring sensor with integrated amplifier arrangement.

Figure 3B:
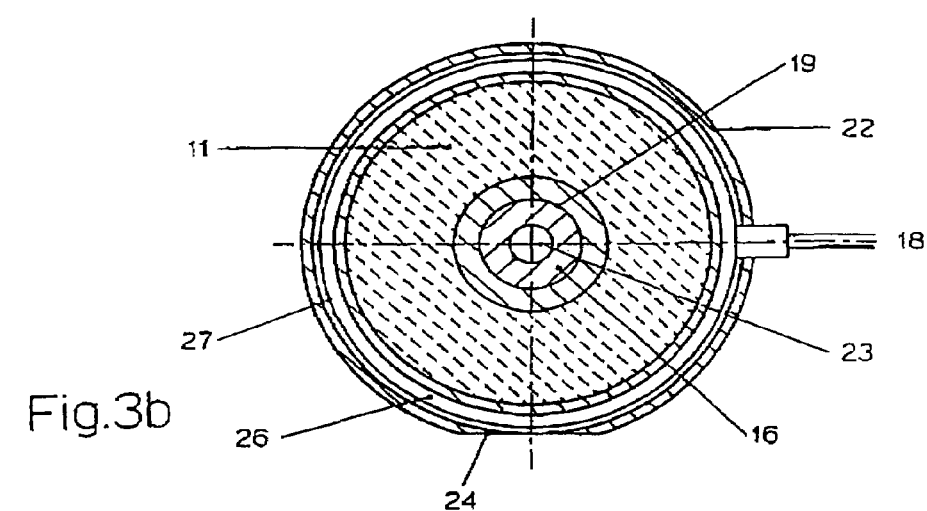
FIG. 3b illustrates the same example of FIG. 3a cut in A-A.

FIG. 3b shows the same arrangement cut in A-A with the same designations.

In this arrangement the connection device 19 of the adaptor element 16 with the adaptor sleeve 22 is attached in adaptor sleeve 22, whereas said connection device 19 in the arrangement of FIG. 2 is attached within adaptor portion 16. All other features of FIG. 2 are included in FIG. 3 as well and provided with the same designations.

Figure 4:
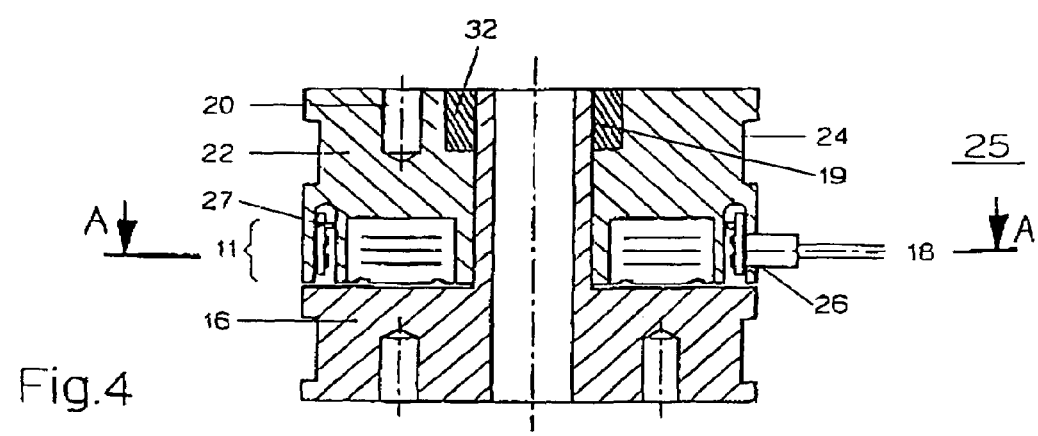
FIG. 4 illustrates a further example of an embodiment of the invention of a measuring sensor under pre-stress with an alternative connection device of the adaptor elements in a cross-sectional view.

In FIG. 4, an alternative embodiment to FIG. 3a is illustrated. The connection between adaptor sleeve 22 and adaptor element 16 is accomplished by means of an indirect screw connection by using a nut 32. While placing the sensor under the desired pre-stress, said nut is mounted onto the adaptor element and tightly clamps the adaptor sleeve under said pre-stress. Thus, the adaptor sleeve 22 with the integrated sensor 11 retains the predefined pre-stress. Other possibilities for the connection 19 would be wedging, welding, bonding or similar arresting of adaptor sleeve 22 and adaptor element 16 to each other in a pre-stressed condition. The advantage of such a connection is that adaptor sleeve 22 and adaptor element 16 are placed in a predefined position to each other. Thereby may be for example ensured that the bore holes 20 being the attachment devices to elements are placed opposite to each other.

Figure 5:
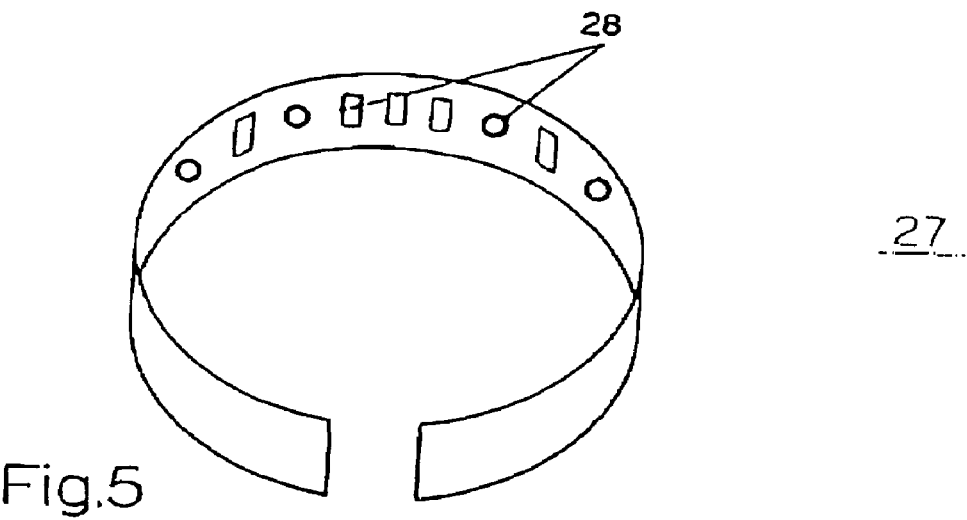
FIG. 5 illustrates an amplifier module in a perspective view.

Additionally, in FIG. 3 an amplifier arrangement 27 is mounted. FIG. 5 shows said amplifier arrangement 27 as an individual module. In this arrangement the amplifier arrangement 27 is formed in the form of an open flat ring and is equipped with the electronic components 28 required for a common amplifier module.

According to the invention, the adaptor sleeve 22 of FIG. 3 or FIG. 4 exhibits a suitable recess 26 laterally outside of the integrated sensor 11 into which the amplifier arrangement 27 may be introduced. In this arrangement amplified signals are transmitted to the connection plug 18. The integration of an amplifier arrangement 27 is also possible in the embodiment of the present invention of a measuring sensor 21. Further embodiments and modifications of the inventive embodiments described herein are feasible according to the preference for practical applications. Thus for example, the connection plug 18 may be attached to the area which is in contact with the component to be measured when the cable layout in this direction is preferred.

In particular, such measuring sensors may be piezoelectric, piezoresistive, optic, capacitive or on the basis of strain gages (DMS).

Figure 6:
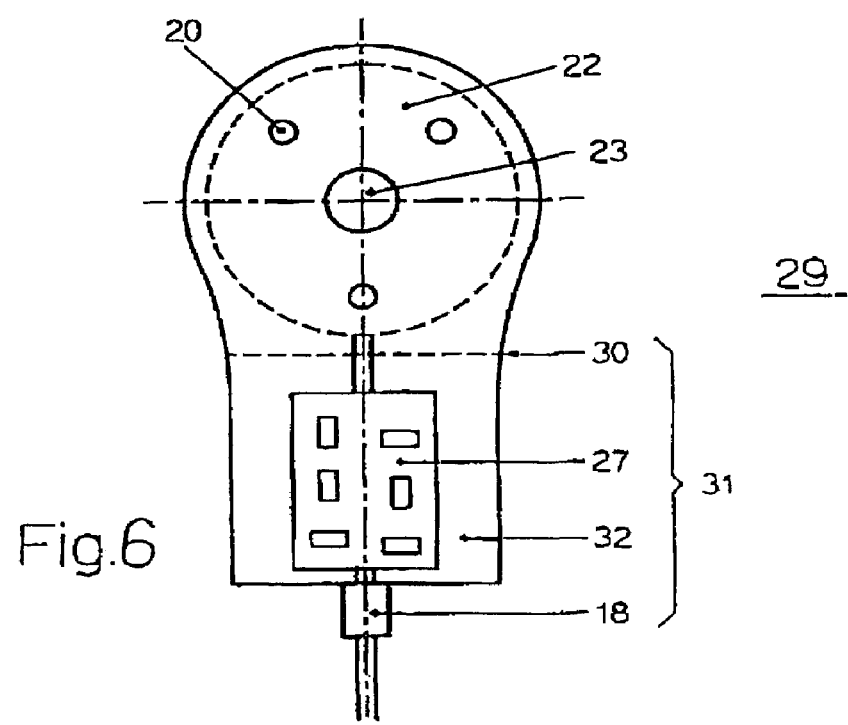
FIG. 6 illustrates an embodiment of the invention of a measuring sensor under pre-stress with an amplifier module connected thereto in a sectional view.

A further embodiment of the present invention of a measuring sensor 29 with external amplifier arrangement is illustrated in FIG. 6. In this embodiment the amplifier casing 31 is provided with the amplifier arrangement 27. Said amplifier casing 31 may be attached to a connection area 30 at adaptor sleeve 22, wherein both the amplifier casing 31 and the adaptor sleeve 22 possess adaptors fitting to each other. In particular, the amplifier casing 31 may exhibit a preferably standardized adaptor, so that it may be coupled to any other measuring sensor, which possess an adaptor matched thereto. In particular, the cross-section of such sensors may be smaller, of equal size or larger than the length of the connection area 30.

Alternatively, the adaptor sleeve 22 may posses an integrated amplifier casing 31, in which the amplifier arrangement 27 may be introduced. By the integration of adaptor sleeve 22 with the amplifier arrangement 27 the connection area 31 can be omitted.

This embodiment also represents a measuring sensor which has a much lower overall height than a measuring sensor built according to the prior art.

Each of the inventive measuring sensors 21, 25, 29 disclosed herein is characterized by its compact design and the thus small height as well as the possibility for simple and cost effective manufacture, since less elements are used and only one single centering has to be carried out. Also, the amplifier modules may be integrated into the arrangement in very different manners. The person skilled in the art can easily conceive further embodiments, arrangements and extensions, e.g. an integration of memory chips for calibration values. In particular, all combinations of the features of the individual embodiments described may easily be prepared without difficulties.

It should be understood that the present invention includes various modifications that can be made to the embodiments of the measuring sensor described herein as come within the scope of the appended claims and their equivalents.

LIST OF DESIGNATIONS 10. measuring sensor as prior art
11. sensor
12. crystal discs (piezo crystal)
13. sleeve
14. membrane
15. welding joint
16. adaptor elements
17. centering sleeve
18. connection plug
19. connection device of the adaptor elements
20. attachment device to components, elements
21. embodiment of the present invention of a measuring sensor
22. adaptor sleeve
23. mounting bore
24. device as a working surface for tools
25. embodiment of the present invention of a measuring sensor with internal amplifier arrangement
26. recess
27. amplifier arrangement
28. electronic components
29. embodiment of the present invention of a measuring sensor with external amplifier arrangement
30. connection area
31. amplifier casing
32. nut

The invention claimed is:

1. A measuring device for measuring forces and/or moments, comprising:
    an adaptor sleeve configured for receiving a sensor so as to hold the position of the sensor centered with respect to an axis through the center of said adaptor sleeve;
    a sensor comprising elements received by said adaptor sleeve wherein the elements of the sensor are directly incorporated into the adaptor sleeve in a centered manner; and
    an adaptor element connected to said adaptor sleeve such that said sensor is positioned between said adaptor sleeve and said adaptor element and such that said sensor is pre-stressed by the connection of said adaptor sleeve and said adaptor element.

2. The measuring device as set forth in claim 1, wherein said adaptor sleeve defines a recess that receives said sensor, and wherein said recess is located on said adaptor sleeve such that said sensor is centered about the axis of said adaptor sleeve.

3. The measuring device as set forth in claim 1, wherein said sensor is an electromechanical element.

4. The measuring device as set forth in claim 1, wherein said sensor is a piezoelectric element.

5. The measuring device as set forth in claim 1, wherein the connection between said adaptor sleeve and said adaptor element is effected through a direct connection by a screw thread.

6. The measuring device as set forth in claim 1, wherein the connection between said adaptor sleeve and said adaptor element is effected through an indirect connection between said adaptor sleeve and said adaptor element, 7. The measuring device as set forth in claim 1, further comprising at least one attachment device carried by at least one of said adaptor element or said adaptor sleeve and configured for attachment to an element to be measured.

8. The measuring device as set forth in claim 1, wherein said adaptor element and said adaptor sleeve define a mounting through bore through the center of said adaptor element and said adaptor sleeve.

9. The measuring device as set forth in claim 1, further comprising a connection plug in communication with said sensor, wherein said connection plug is configured for transmission of measuring signals.

10. The measuring device as set forth in claim 1, further comprising an amplifier arrangement for amplification of a signal from said sensor.

11. The measuring device as set forth in claim 1, further comprising an amplifier arrangement carried within a recess defined by said adaptor sleeve.

12. The measuring device as set forth in claim 1, further comprising an amplifier casing connected to said adaptor sleeve, and further comprising an amplifier arrangement carried by said amplifier casing.

13. The measuring device as set forth in claim 12, wherein said amplifier casing is removably connected to said adaptor sleeve.

* * * * *